United States Patent [19]
Hisano

[11] Patent Number: 5,506,936
[45] Date of Patent: Apr. 9, 1996

[54] FUZZY INFERENCE SYSTEM AND A PATTERN INPUT TYPE MEMBERSHIP VALUE GENERATOR

[75] Inventor: Atushi Hisano, Nagaokakyo, Japan

[73] Assignee: Omron Corporation, Kyoto, Japan

[21] Appl. No.: 378,870

[22] Filed: Jan. 24, 1995

Related U.S. Application Data

[63] Continuation of Ser. No. 79,739, Jun. 22, 1993, abandoned.

[30] Foreign Application Priority Data

Jul. 17, 1992 [JP] Japan ................................. 4-212379

[51] Int. Cl.⁶ ............................................... G06F 15/00
[52] U.S. Cl. ................... 395/3; 395/61; 395/900; 382/181
[58] Field of Search ............................... 395/11, 3, 21, 395/51, 61, 900; 382/181

[56] References Cited

U.S. PATENT DOCUMENTS

| | | | |
|---|---|---|---|
| 4,809,175 | 2/1989 | Hosaka et al. ............................ | 395/3 |
| 4,837,725 | 6/1989 | Yamakawa ............................... | 395/3 |
| 4,864,490 | 9/1989 | Nomoto et al. .......................... | 395/3 |
| 4,931,933 | 6/1990 | Chen et al. .............................. | 395/11 |
| 5,127,063 | 6/1992 | Nishiya et al. .......................... | 395/900 |
| 5,159,667 | 10/1992 | Borrey et al. ........................... | 395/900 |
| 5,265,222 | 11/1993 | Nishiya et al. .......................... | 395/3 |
| 5,359,697 | 10/1994 | Smith et al. ............................. | 395/3 |

Primary Examiner—Allen R. MacDonald
Assistant Examiner—Richemond Dorvil
Attorney, Agent, or Firm—Dickstein, Shapiro & Morin

[57] ABSTRACT

An input variable and a category of pattern are combined in antecedent of a fuzzy rule. Input pattern data of the input variable is stored in a pattern memory. An extracting program proper to the category is read out from a library by a category signal in combination with the input variable, feature quantity of input pattern data is extracted in a feature extracting unit according to the program, and a feature vector is computed. A feature vector of standard pattern is read out from library by the category signal. In a distance computing section, a distance between feature vector and standard vector is computed, and an adaptation degree about category of input pattern data is generated based on the distance in an adaptation degree generator.

19 Claims, 9 Drawing Sheets

| | INPUT SELECTION CODE S1 | | | | ANTECEDENT CODE S2 | | | | | | | CONSEQUENT CODE S3 | | | | CONTROL CODE C1 C2 C3 C4 | | | | OUTPUT VARIABLE CODE Z | | | |
|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| | | | | | S20 | S21 | | | | S22 | | | | | | | | | | | | | |

Input Selection Code S1:
0000: TV CAMERA1
0001: TV CAMERA2
0010: SPEED SENSOR
0011: LENGTH SENSOR
......

$S22 \begin{cases} 00: n=1 \\ 01: n=2 \\ 10: n=3 \\ 11: n=4 \end{cases}$ $S20 \begin{cases} 0: \text{SCALA} \\ 1: \text{PATTERN} \end{cases}$

S21 (S20=0) ANTECEDENT FUZZY LABEL
0000: NL
~
0000: PL

S21 (S20=1) CATEGORY NAME DESIGNATION
0000: RED SPORT CAR
0001: DUMP TRUCK
......
0100: MAN
0101: CHILD
0111: OLD PERSON

CONSEQUENT FUZZY LABEL
0000: NL
0001: NM
0010: NS
0011: ZR
0100: PS
0101: PM
0110: PL

C1=1 FIRST SUBRULE OF EACH RULE
C2=1 LAST SUBRULE OF EACH RULE
C3=1 START OF RULE GROUP
C4=1 LAST OF RULE GROUP

0000: SPEAKER

FIG. 6

RULE 1

SUBRULE11  CAM1=RED SPORT CAR
0000        1        0000       00      1111      1000         1111
(S1)       (S20)    (S21)      (S22)    (S3)     (C1C2C3C4)    (Z)
TV         PATTERN   RED                          FIRST
CAMERA1              SPORT CAR   n=1              SUBRULE

SUBRULE12  SPEED=PL
0010        0        0110       00      1111      0000         1111
(S1)       (S20)    (S21)      (S22)    (S3)     (C1C2C3C4)    (Z)
SPEED      SCALA    P L
SENSOR

SUBRULE13  VOL=PM
1111        0        1111       00      0101      0110         0000
(S1)       (S20)    (S21)      (S22)    (S3)     (C1C2C3C4)    (Z)
                                         P M     LAST SUBRULE·SPEAKER
                                                 START OF
                                                 RULE GROUP

FUZZY INFERENCE SYSTEM AND A PATTERN INPUT TYPE MEMBERSHIP VALUE GENERATOR

This application is a continuation, of application Ser. No. 08/079,739, filed Jun. 22, 1993, now abandoned.

BACKGROUND OF THE INVENTION

1. Field of the Invention

This invention relates to a fuzzy inference system for processing fuzzy conception found in pattern information or data, and a pattern input type membership value generator employed in the fuzzy inference system.

2. Discussion of the Related Art

Fuzzy technology is a technology for processing vagueness. A data process executed by men is performed by using vague language, and many human knowledge are expressed by using such vague language.

Knowledge (rules) expressed by such vague language is classified by the following various levels:

(1) IF water draw is "little", the season is "spring" and the time is "morning", THEN the pouring ratio is slightly enlarged.

(2) IF a pictured image is "sport car", its color is "reddish", and its speed is "high", THEN alarm is set to a medium degree.

(3) IF a pictured image is "stiff" and its pattern is "quiet", THEN purchase desire is decreased.

(4) IF a company management is "innovative" and its atmosphere is "cheerful", THEN popularity by students increases.

(5) IF our working is "good", THEN society is improved.

Most of conventional fuzzy technologies allow fuzzy inference or fuzzy control by employing membership values (degrees of adaptation) generated from membership functions entered by scalar quantity signals. In the above-mentioned knowledge, for example, "little" of the item (1) and "high" of the item (2) are scalar quantity. "spring" and "morning" in the knowledge of the items (1) and (2) may be converted to scalar quantity. The conventional fuzzy technologies can process only the knowledge at the level of the item (1). Processable data are limited to data in which a scalar type of physical quantity is defined as a trapezoidal set and a membership function can be defined in the trapezoidal set.

Fuzzy conception such as sport car in the knowledge of the above item (2) cannot be expressed by any membership function based on a trapezoidal set of a single scalar type of physical quantity, nor by any framework of membership function. The pattern conception of "sport car" cannot be expressed by other framework than the framework of at least entering a picture image given by television camera. Generally speaking, the knowledge of the above item (2) requires a framework for processing a fuzzy conception corresponding to pattern data.

The knowledge of the above item (3) also requires a framework for processing a fuzzy conception corresponding to pattern data, like the knowledge of the item (2). Though in the item (2) physical pattern data is directly processed, in he item (3) a pattern obtained by reproducing an image of physical patter data in other space is processed. The knowledge of the items (4) and (5) are scalar type of physical quantity, but do not correspond to any physical pattern data. In fact, kinds of the data to be corresponded cannot be known. Conveniently it is possible to make various operating index or a value of results of questionnaire correspond to the knowledge of the above item (4) or (5). It is, however, apparent to do not catch any substance of the knowledge of the item (4) or (5).

Thus, according to conventional fuzzy technologies, only scalar type of physical quantity can be processed, whereby only very simple knowledge can be expressed. Accordingly, conventional fuzzy technology has the disadvantage that complicated data process for supporting decision making or estimate by men is difficult.

SUMMARY OF THE INVENTION

It is, therefore, a primary object of this invention to provide a fuzzy inference system or method capable of processing pattern data in fuzzy inference or fuzzy control.

It is a further object of this invention to provide a fuzzy inference system or method in which input pattern data is compared to a category defined by a fuzzy rule to obtain its adaptation degree, so that pattern data can be processed in fuzzy inference in the same manner as that of scalar quantity.

It is a still further object of this invention to provide a fuzzy inference system or method in which both input signal of scalar quantity and input data expressed by pattern can be processed, whereby application of fuzzy inference is enhanced.

It is another object of this invention to provide an adaptation degree generating device and method, and membership value generating device or method for processing pattern data employed in the fuzzy inference system or method.

According to a first aspect of this invention, there is provided a fuzzy inference system which comprises a rule memory in which an input variable of scalar quantity is expressed by using a membership function, an input variable of pattern data is expressed by using a pattern category and a fuzzy rule including a distinction code identifying whether an input variable is scalar quantity or pattern data is previously stored therein, a first adaptation degree operation circuit means for finding a adaptation degree of the input variable to express scalar quantity about a membership function designated by a rule read from the rule memory to be processed, a second adaptation degree operation circuit means for a adaptation degree of the input variable to express pattern data about a category designated by a rule read from the rule memory to be processed, a switching circuit means for Switching the first and second adaptation degree operation circuit means in accordance with the distinction code of the rule read from the rule memory to be processed, and an inference operation circuit means for applying a predetermined operation to an adaptation degree generated from the first or second adaptation degree operation circuit means selected by the switching circuit means to generate a fuzzy inference output.

According to a second aspect of this invention, there is provided a fuzzy inference method comprising the steps of: expressing an input variable of scalar quantity by using a membership function and an input variable of pattern data by using a pattern category, previously storing into a rule memory a fuzzy rule including a distinction code identifying whether the input variable is scalar quantity or pattern data, reading a fuzzy rule from the rule memory, finding an adaptation degree of the input variable to express scalar quantity about a membership function designated by the read fuzzy rule when the input variable of the rule is scalar quantity, finding an adaptation degree of the input variable to express pattern data about a category designated by the read fuzzy rule when the input variable is pattern data, and applying a predetermined operation to the found adaptation degree to generate a fuzzy inference output.

According to this invention, input pattern data is compared to a category defined by a fuzzy rule to obtain its adaptation degree, so that pattern data can be processed by fuzzy inference in the same manner as that of scalar quantity.

Particularly according to a fuzzy inference system or method of this invention, both input signal of scalar quantity and input data expressed by pattern can be processed, whereby application of fuzzy inference is enhanced. This invention also provides adaptation degree generating device and method, and membership value generating device and method for processing pattern data employed in the above-mentioned fuzzy inference system or method.

According to a third aspect of this invention, there is provided an adaptation degree generating device for developing an adaptation degree in accordance with a fuzzy rule expressed by using a category of pattern about an input variable of pattern data, which comprises a standard pattern memory for previously storing standard pattern data for each of a plurality of categories, a distance computing circuit means for computing a distance between input pattern data and a standard pattern data of a category designated by a fuzzy rule of the memory, and an adaptation degree generating circuit means for converting the distance generated from the distance computing circuit means to an adaptation degree which is a value "1" when the distance is zero and decreases as the distance increases.

According to a fourth embodiment of this invention, there is provided a method for generating an adaptation degree in accordance with a fuzzy rule expressed by using a category of pattern about an input variable of pattern data, which comprises the steps of previously storing standard pattern data into a standard pattern memory for each of a plurality of categories, computing a distance between input pattern data and a standard pattern data of a category designated by a fuzzy rule of the memory, and converting the computed distance to an adaptation degree which is a value "1" when the distance is zero and decreases as the distance increases.

According to a fifth aspect of this invention, there is provided a pattern input type of membership value generating device which comprises a pattern data input means for entering pattern data, a standard pattern data generating means for converting a category related to pattern data entered by the pattern data input means into standard pattern data about the category, a distance computing circuit means for computing a distance between input pattern data entered through the pattern data input means and standard pattern data generated by the standard pattern data generating means, and an adaptation degree generating circuit means for converting the distance generated from the distance computing circuit means to an adaptation degree which is a value "1" when the distance is zero and decreases as the distance increases.

According to sixth aspect of this invention, there is provided a pattern input type membership value generating method which comprises the steps of entering given pattern data, converting a category related to the entered pattern data into standard pattern data about the category, computing a distance between the entered pattern data and a standard pattern data generated by the standard pattern data generated by the conversion, and converting the computed distance to an adaptation degree which is a value "1" when the distance is zero and decreases as the distance increases.

There are several methods for computing the above-mentioned distance. One method is to generate a feature vector of standard pattern data, extract a feature quantity of an input pattern data, generate a feature vector from the extracted feature quantity, and compute a distance between the feature vector of the standard pattern data and the feature vector of the input pattern data. Other method is to execute a matching of standard pattern data and input pattern data, and to compute the above-mentioned distance based on an inconsistency degree.

Thus, this invention provides a broad application in fuzzy technologies by processing pattern data as conventional scalar quantity because input pattern data is compared with standard pattern data of category related by a rule to find an adaptation degree of input pattern data.

BRIEF DESCRIPTION OF THE DRAWINGS

The above and other objects, advantages and features of this invention will be more fully understood from the following detailed description provided in conjunction with the following figures, of which.

DETAILED DESCRIPTION OF THE INVENTION

At first, for comprehensive understanding, an application of a fuzzy inference system or a fuzzy control system for processing scalar quantity and pattern data will be explained.

Figure 1:
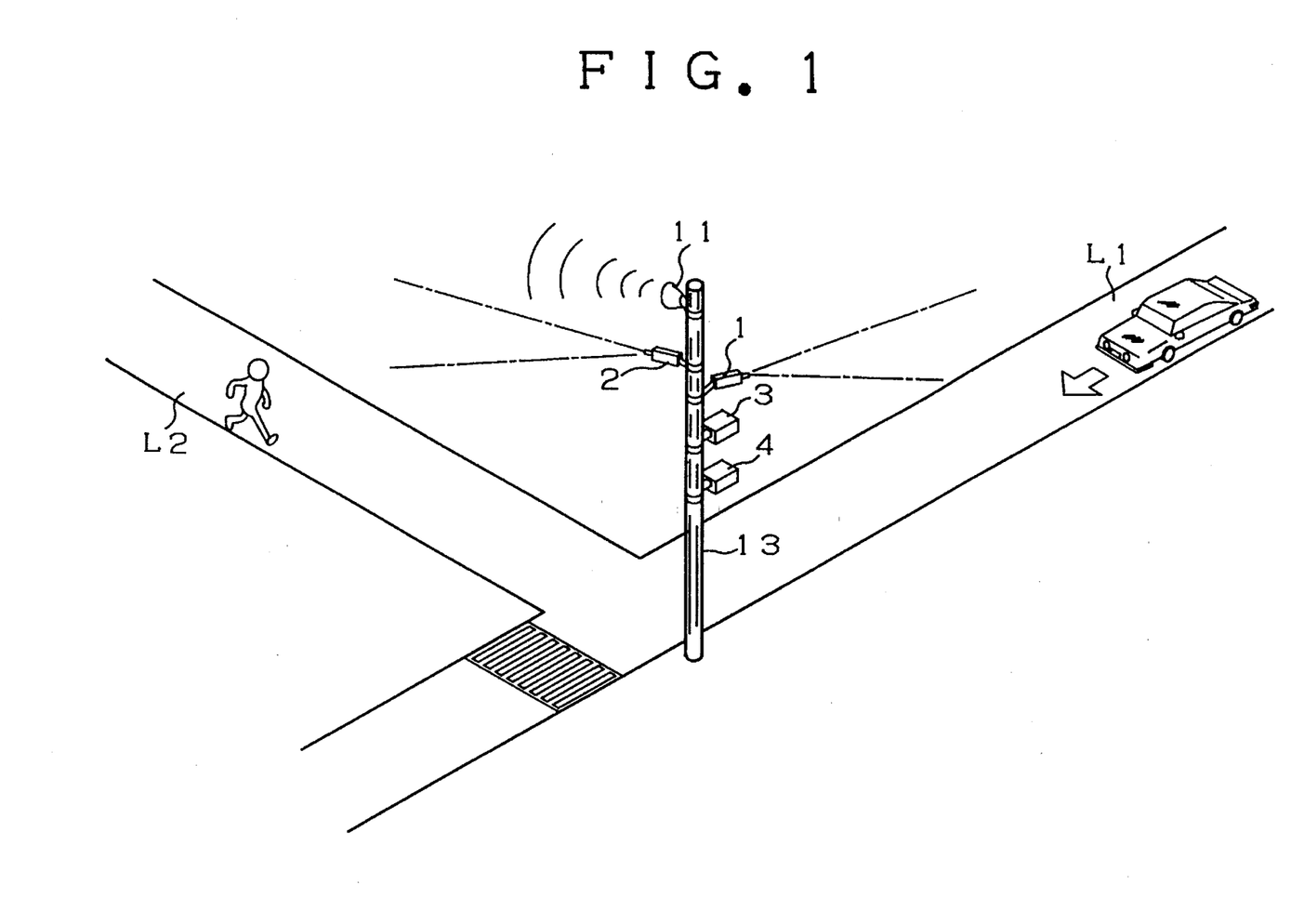
FIG. 1 is a perspective view of an alarm system as an application of a fuzzy inference system according to a preferred embodiment of this invention.

Referring, now, to FIG. 1, there is shown a perspective view of an alarm system as one application of the fuzzy inference system as a preferred embodiment of this invention.

It is assumed that a first road L1 run by a motor car is crossed by other road L2 at T-shape (or "+" shape) corner. An alarm having a sound volume corresponding to a degree of danger in view of a kind, a running speed, and a distance to the cross corner is designed to be given to a person who is walking on road L2 to go across road L1.

A pole 13 stands near the corner, and is mounted by sensors. The sensors include a television camera 1 taking a picture of a car running on road L1 to the corner, a television camera 2 taking a picture of a person walking on road L2 to the corner, a speed sensor 3 measuring a speed of the car on road L1, and a length or distance sensor 4 measuring a distance from the car to the corner. Cameras 1 and 2 serve pattern data sensors to enter pattern data or data, and sensors 3 and 4 serve scalar quantity sensors to enter scalar quantity. The pole 13 is further provided with a speaker generating an alarm sound to the person walking on road L2.

This alarm system employs the following fuzzy rules to generate an alarm sound volume corresponding to a degree of danger applied to the walker.
(RULE 1)

IF CAM1=Red sport car & SPEED=PL, THEN VOL=PM (If camera 1 catches a red sport car and its speed is very fast, the alarm sound shall be set to a medium level.)
(RULE 2)

IF LENG=PL & SPEED=PM, THEN VOL=ZR (If the distance from a car running to the corner is very long and the speed of the car is medium, the alarm sound shall be set to zero.)
(RULE 3)

IF CAM2=Man & CAM1=Dump truck & LENG=PS & SPEED=PL, THEN VOL=PL (If camera 2 catches a man, camera 1 catches a dump truck, the distance to the dump truck is short and its speed is very fast, the alarm sound shall be set to large.)
(RULE 4)

IF CAM1=Dump truck in rough view & CAM2=Child in careful view, THEN VOL=PM (If camera 1 catches a dump truck in rough view and camera 2 catches a child in careful view, the alarm sound shall be set to medium.)

CAM1 and CAM2 are input variables representing a picture obtained from cameras 1 and 2, SPEED and LENG are input variables representing speed and distance obtained from speed sensor 3 and distance sensor 4, and VOL is an output variable representing a volume of alarm sound to be emitted from speaker 11.

Input variables CAM1 and CAM2 include pattern data or data, such as man, child, dump truck, and red sport car. The man, child, dump truck, and red sport car are name of category of pattern data. The rules of pattern data include factors of strictness of input pattern data or strictness of application in fuzzy inference of input data such as "rough view" and "careful view".

Input variables SPEED and LENG and output variable VOL are combined with membership functions. Membership functions are expressed by fuzzy labels, NL, NM, NS, ZR, PS, PM and PL which respectively mean large in negative, medium in negative, small in negative, almost zero, small in positive, medium in positive and large in positive.

Figure 2:
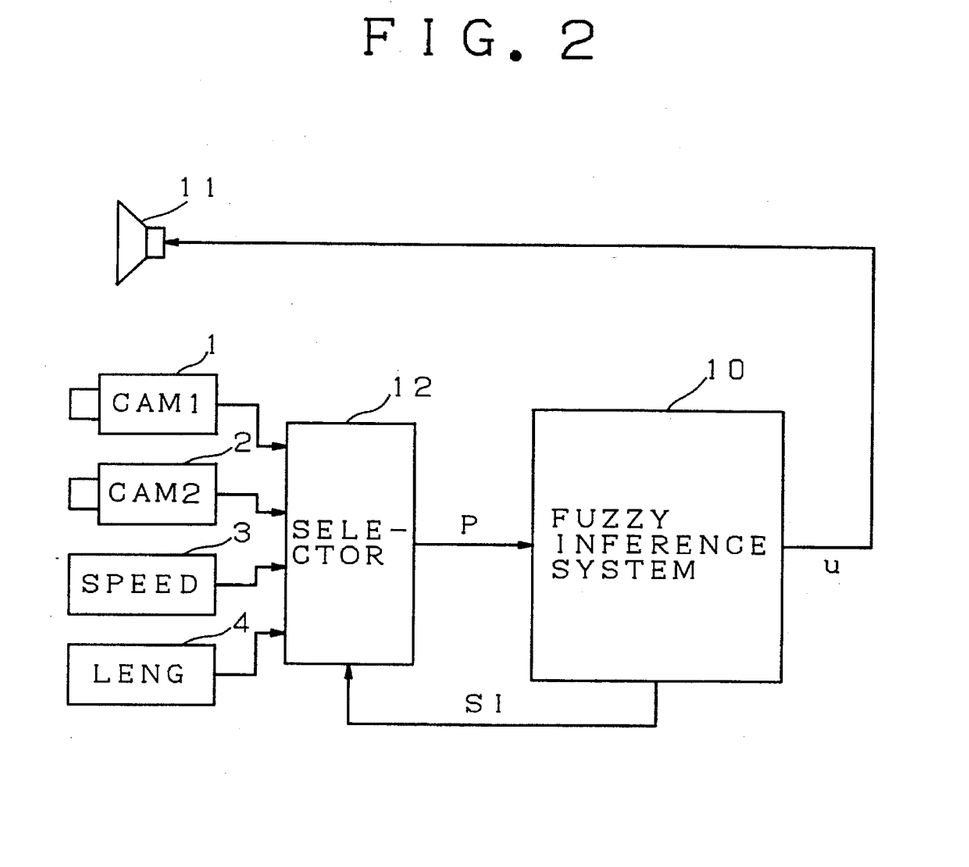
FIG. 2 is a schematic block diagram showing an electronic construction of the alarm system of FIG. 1.

FIG. 2 shows a electronic Construction of the alarm system. The above-mentioned fuzzy rules are stored into fuzzy inference system 10 which may be constructed with a hardware architecture, a computer storing a program to execute a process in accordance with fuzzy rules, or partly hardware and partly software.

The fuzzy inference system 10 generates an input selection signal S1 subject to a fuzzy rule to selectively take output signals of four kinds of sensors 1 to 4. One of image signals (or picture data after an A/D converter) generated from television cameras 1 and 2, a signal representing a detected speed generated from speed sensor 3, and a signal representing a detected distance generated from detection sensor 4 is applied to fuzzy inference system 10 through a selector 12 controlled by input selection signal S1. An output of selector 12, which is a selected input signal P to be applied to fuzzy inference system 10, includes pattern data such as image data and scalar quantity of speed and distance.

As described in detail hereinafter, an inference output "u" representing an inference result is obtained by executing a fuzzy inference subject to a fuzzy rule in fuzzy inference system 10. The inference output "u" represents an alarm sound volume and controls an electric current applied to speaker 11.

Figure 3:
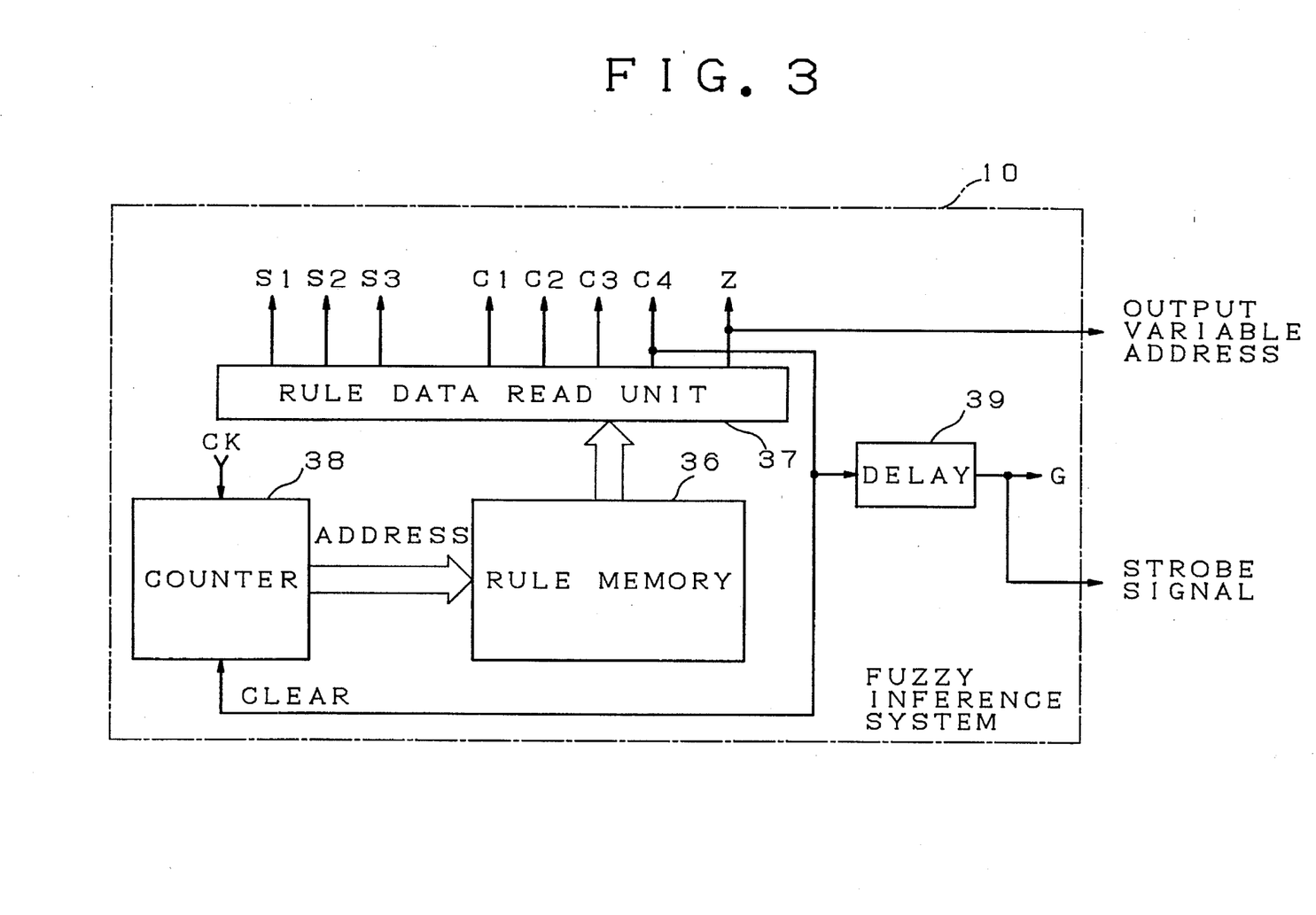
FIG. 3 is a schematic block diagram of a rule memory and its peripherals as a part of the fuzzy inference system of FIG. 1.
Figure 4:
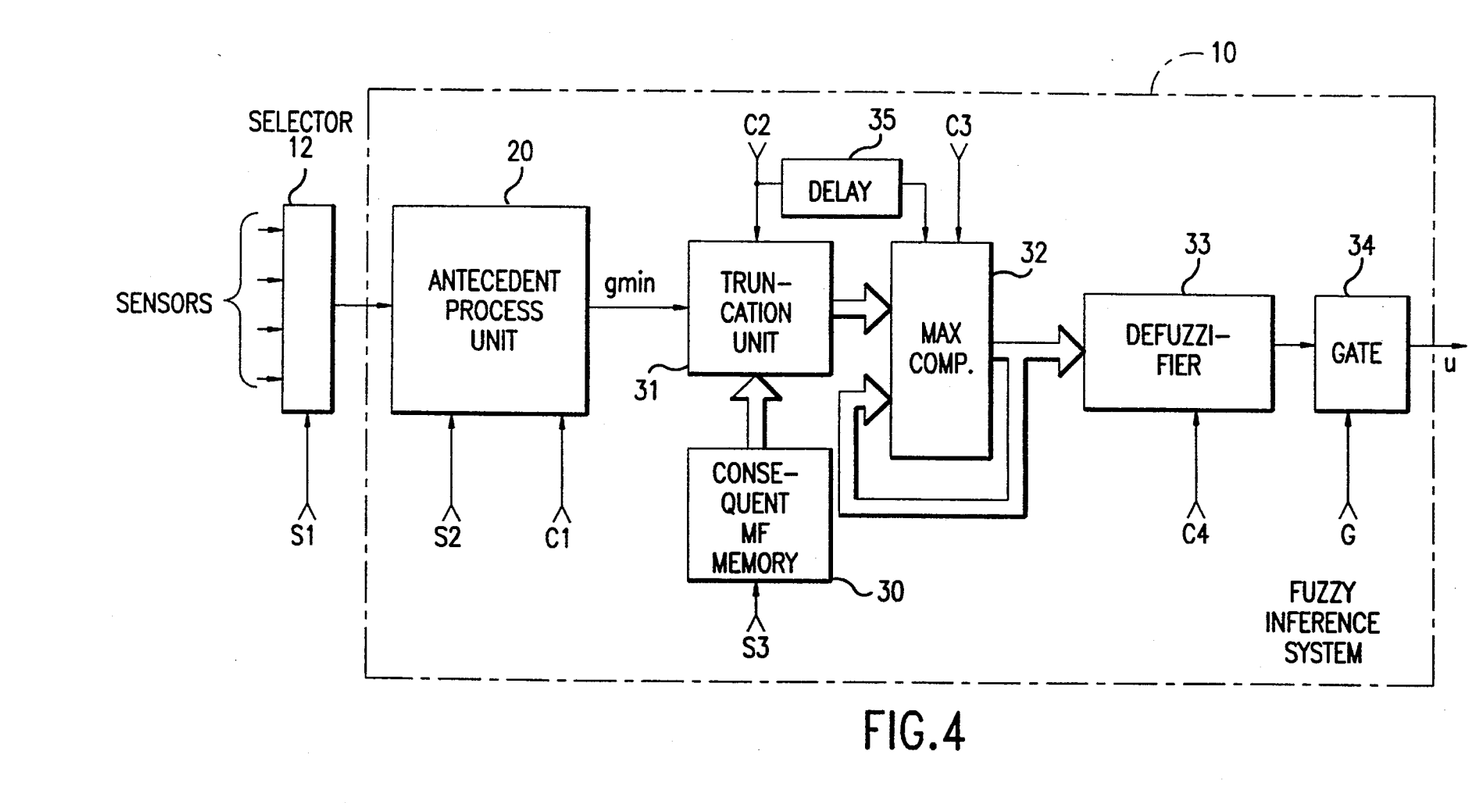
FIG. 4 is a schematic block diagram of a section for executing fuzzy inference as other part of the fuzzy inference system.

Fuzzy inference system 10 is substantially dived into a section of FIG. 3 including a rule memory 36 and its peripherals and into an inference executing section of FIG. 4.

Now, the rule memory with its peripherals and codes representing rules stored in the rule memory will be described hereinafter.

Figure 6:
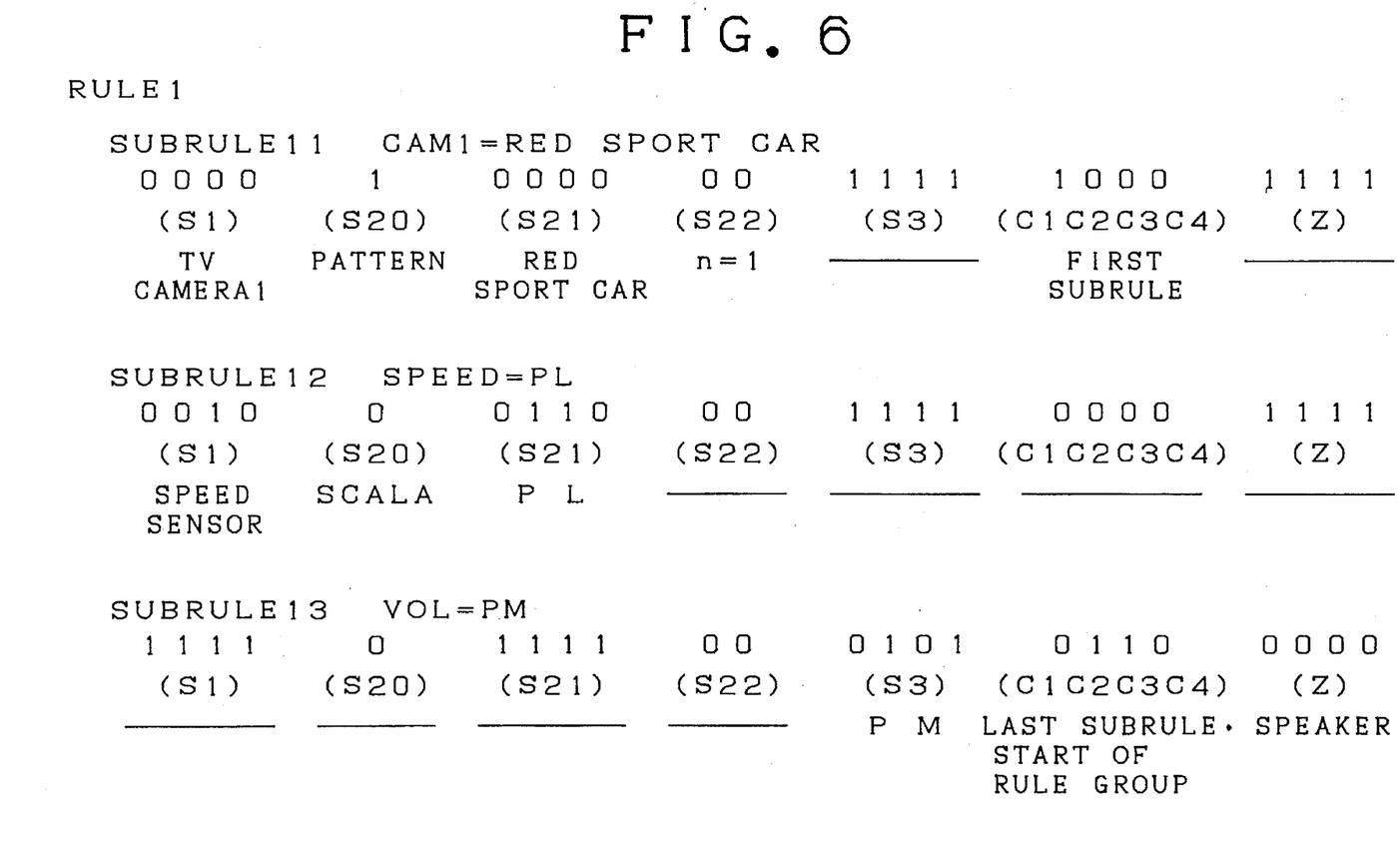
FIG. 6 is an embodiment of a rule code.

Each rule is analyzed into a plurality of subrules. For example, the above-mentioned RULE 1 is analyzed into the following three subrules (see FIG. 6):

(SUBRULE 11) CAM1=Red sport car
(SUBRULE 12) SPEED=PL
(SUBRULE 13) VOL=PM

Figure 5:
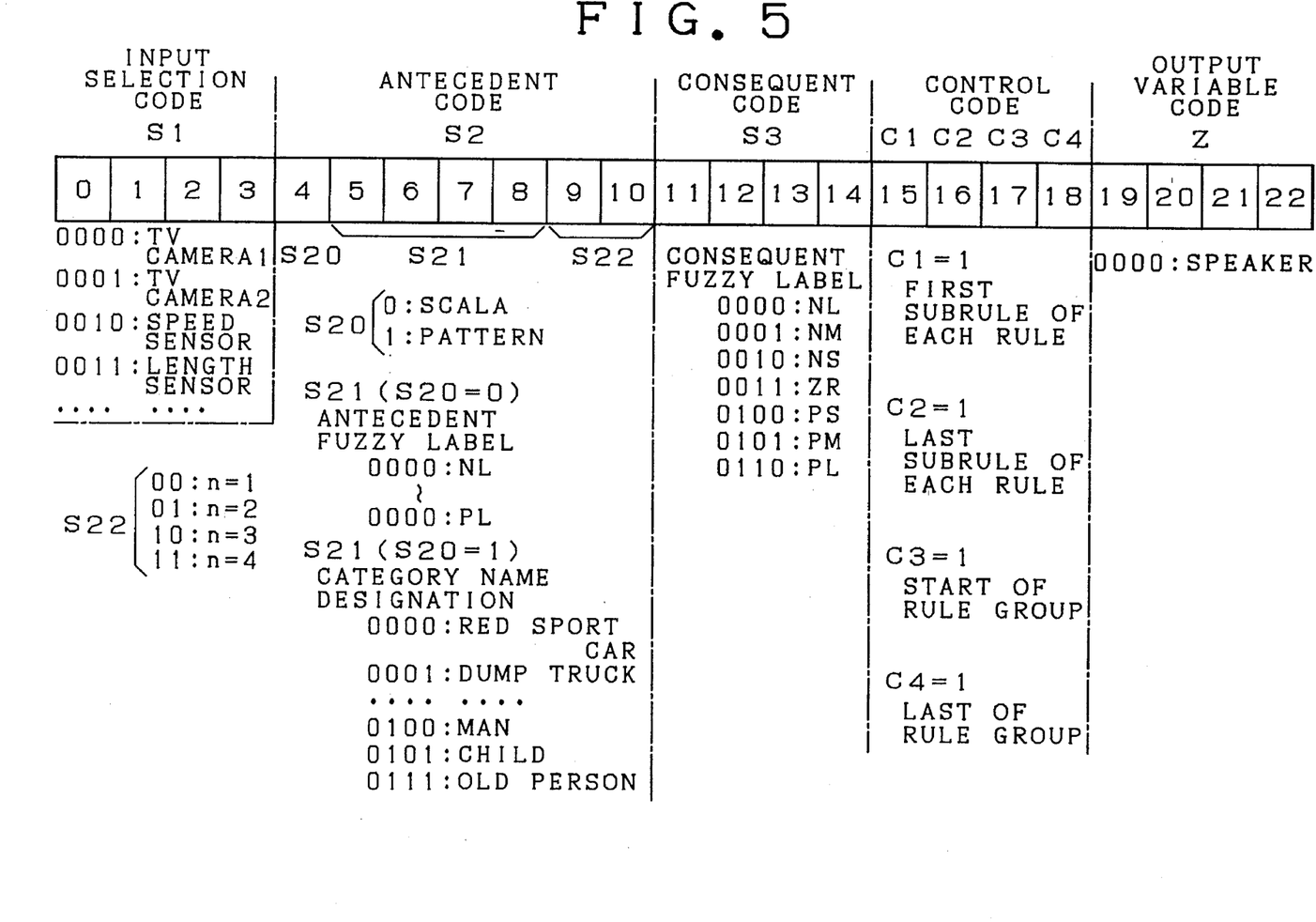
FIG. 5 is a construction of a rule code.

These subrules are expressed by rule codes having a construction shown in FIG. 5. The rule codes are constituted with 23 bits, but number of the bits in each part may be optionally increased or decreased.

First four bits represent an input selection code S1 to provide the above-mentioned input selection value signal S1. Same mark is applied to each code in rule codes and a signal generated by the code hereinafter. As shown in FIG. 5, by this four bit code, camera 1, camera 2, speed sensor 3, detection (length) sensor 4, and so forth are designated. The input selection signal S1 based on this code controls selector 12 as described above.

The following seven bits represent an antecedent code S2, and are divided into three codes S20, S21 and S22. Code S20 shows a distinction whether an input variable is scalar quantity or pattern data. S20=1 when pattern data of CAM1 and CAM2 are entered, and S20=0 when scalar quantity of SPEED and LENG is entered.

The subsequent code S21 is different when S20=0 and when S20=1. When S20=0, code S21 expresses an antecedent fuzzy label (NL-PL). Assignment of code S21 about fuzzy label is same as that of consequent code S3 described later. When S20=1, code S21 is used for designating category name (red sport car, dump truck, man, child and so forth).

The last code S22 is effective when S20=1, viz., pattern data is applied, and represents the above-mentioned strictness such as "rough view" or "careful view" or strength of application. In this embodiment, the strictness is classified to four levels (n=1 to 4).

The consequent code S3 represents fuzzy label of consequent.

Control codes C1, C2, C3 and C4 are set to "1" in the following cases, and to "0" in other cases. Ci=1 means a first subrule of each rule. C2=1 means the last subrule of each rule. C3=1 means a lead of a series of rules stored in the rule memory. C4=1 means an end of a series of rules.

The last variable code Z shows a kind of an output variable. In this embodiment there is only an output unit of speaker, so that there is only one output variable. Generally a plurality of output units or actuators are controlled by fuzzy inference system outputs, so that there can be a plurality of kinds of output variables.

In FIG. 6, there are shown rule codes respectively representing subrules 11, 12 and 13 of RULE 1. Subrules 11 and 12 relate to antecedent, whereby a code "1111" showing no elation thereto is set in the codes S3 and Z relating to consequent. Code S22 has no meaning because subrule 12 relates to scalar quantity (S20=0). Herein S22=00 is set for convenience.

Subrule 13 relates to consequent, whereby a code representing no relation is set in code S1 and S2=S20+S21+S22 which relate to antecedent. These codes representing no relation are S1=1111, S20=0, S21=1111, and S22=00. These codes may be any other codes if the respective circuits in fuzzy inference system are not erroneously operated.

Since subrule 11 is a first subrule of RULE 1, C1=1 is set. Since subrule 13 is a last subrule of RULE 1, C2=1 is set. Since RULE 1 is a lead of a series of rules, C3=1 representing it is set in subrule 13.

Referring to FIG. 3, a series of subrules having the construction of FIG. 5 are previously stored in rule memory 36 by corresponding their order with address order. A clock signal CK is applied to a counter 38 which counts the clock signal to generate an address signal ADDRESS subsequently incremented.

The address signal is applied to rule memory 36, whereby a series of rule codes are read out from rule memory 36 in the order of address by a rule data read unit 37. The respective codes S1, S2(=S21+S22+S23), S3, C1–C4, and Z providing a rule code are read out, and the respective kinds of control signals generated by these codes are applied to the respective circuit elements of fuzzy inference system 10.

When the last subrule of the last rule is read out in the series of rules set, C4=1 is set whereby counter 38 is reset. A control signal based on this control code C4 is applied through a delay circuit 39 to a later described gate circuit 34 as a gate control signal G, and generated as a strobe signal. The delay circuit 39 is provided to guarantee an operation time for a defuzzifier 33 so that the operation time for defuzzifying process and input signal be delayed.

A signal based on an output variable code Z is externally generated as an output variable address signal for designating an output unit or actuator to be controlled by an inference output produced by fuzzy inference.

In reference to FIG. 4, an operation of the fuzzy inference system will be briefly explained.

Whenever a rule code of a subrule is read out, an output signal of a sensor necessary for process by the subrule is entered through selector 12 by input selection code S1 included in the rule code to an antecedent process unit 20 as a selected input P. Though a detailed construction of antecedent process unit 20 will be described later referring to FIGS. 7 to 9, it is provided with antecedent code S2 and control code C1. The antecedent process unit generates an antecedent adaptation degree $g_{min}$ for application to truncation unit 31. Since control code C2=1 is set in the last subrule (subrule relating to consequent) of each rule, a rule unit control signal based on the control code C2 is applied to the truncation unit. In response to the control code C2, truncation unit 31 receives the antecedent adaptation degree $g_{min}$ to execute the following truncation operation.

Data representing membership functions of NL to PL are previously stored in a consequent membership function (MF) memory 30. The data may be function value table, numeric equation or its parameter which represents membership function. A consequent membership function designated by consequent code S3 included in subrule relating to consequent is read out from the memory 30 for application to truncation unit 31. Truncation unit 31 truncates by a level of the received antecedent adaptation degree $g_{min}$ an consequent membership function entered from consequent MF memory 30. This is a truncation process.

A MAX composite circuit 32 is applied by a control signal based on control code C3 representing start of a rule group.

When the control signal C3 becomes "1", circuit 32 starts its operation.

When signal C2 delayed in delay circuit 35 by time necessary for operation of truncation unit 31 is applied to MAX composite circuit 32, the circuit 32 receives the membership function truncated by truncation unit 31. Receipt by circuit 32 of truncated membership function is executed for each rule. MAX composite circuit 32 executes a MAX operation of membership function truncated in each rule for each receipt thereby.

If a series of all rules are completed to be read, C4=1 is available in reading the last subrule. The rule completion signal based on control code C4 is applied to defuzzifier 33, and the defuzzifier receives the membership function MAX-composed by MAX composite circuit 32 to defuzzify the membership function received by gravity center operation and other ways.

After this, a gate of gate circuit 34 is opened by gate control signal G, and inference output "u" defuzzified in defuzzifier 33 is externally generated through gate circuit 34.

Figure 7:
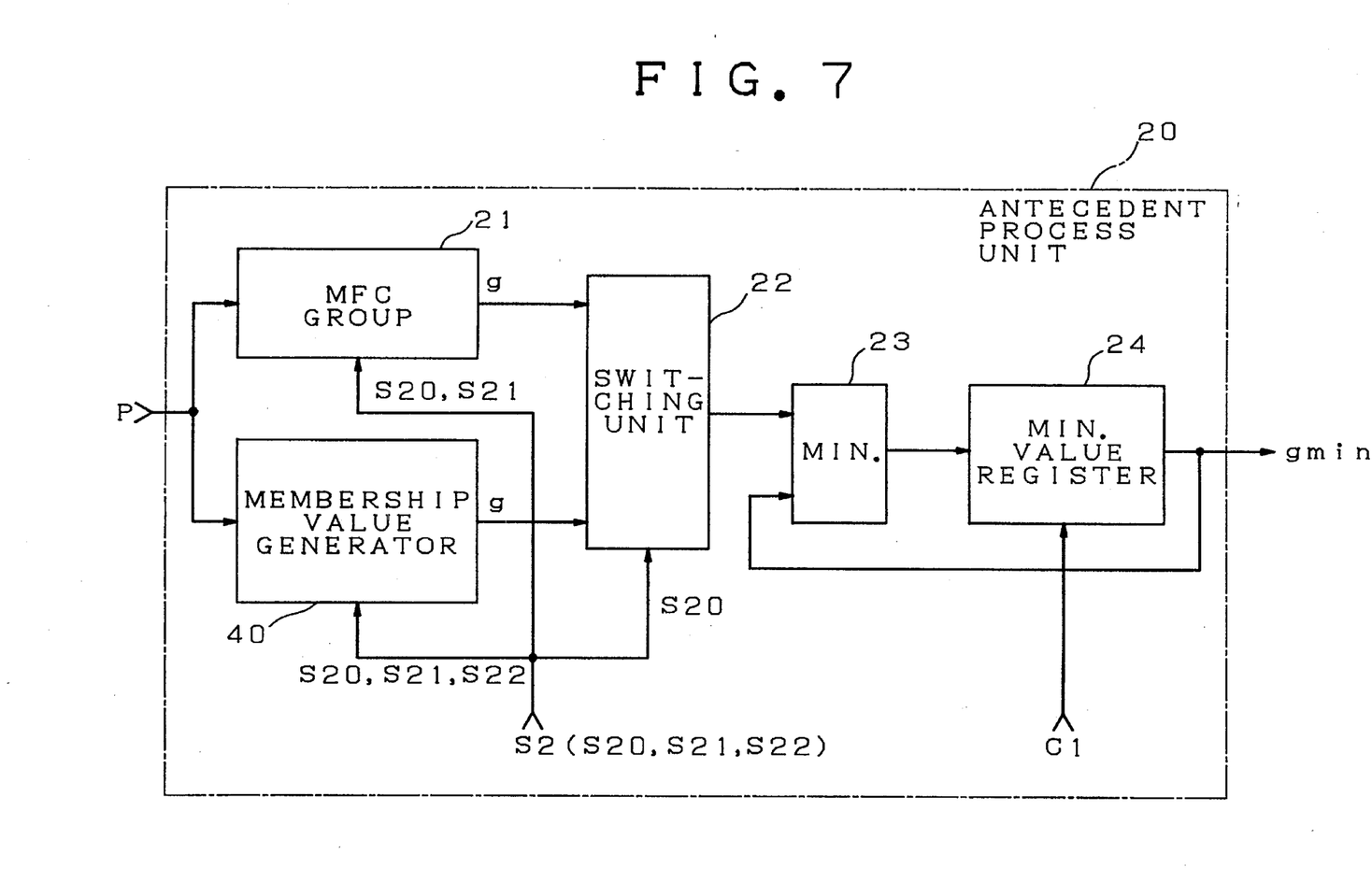
FIG. 7 is a schematic block diagram of an antecedent process unit.

Referring to FIG. 7, construction and operation of antecedent process unit 20 will be described hereinafter.

In codes providing antecedent code S2 included in a subrule relating to antecedent, codes S20 and S21 are applied to a membership function circuit (MFC) group 21, all codes S20, S21 and S22 are applied to a membership value generator 40, and code S20 is applied to a switching unit 22.

When S20=0, selected input signal P is received by MFC group 21. When S20=1, the input signal P is received by membership value generator 40.

MFC group 21 includes membership function circuits (MFCs) generating membership function signals of the above-mentioned antecedent fuzzy labels NL-PL. In the MFCs, designated one by code S21 is selected. The input signal P expressing scalar quantity is applied to the selected MFC, and a signal representing a membership function value corresponding to input signal P is generated as a signal representing an adaptation degree "g". Accordingly, the adaptation degree "g" is generated for each subrule of antecedent.

Though membership value generator 40 will be described later in detail referring to FIG. 8, the generator 40 receives the input signal P representing pattern data to generate a signal representing adaptation degree "g" for each subrule.

Output adaptation degree "g" of MFC group 21 when S20=0 or output adaptation degree "g" of membership value generator 40 when S20=1 is applied to MIN circuit 23 through switching unit 22.

MIN circuit 23 chooses smaller one of the received adaptation degree "g" and a value stored in MIN value register 24. The chosen value is stored in the MIN value register. Control code C1=1 is provided in process of first subrule of each rule. MIN value register 24 is set to its initial value (logic value 1) by control signal based on the control code C1.

For each operation of adaptation degree "g" according to a Subrule, a value in MIN value register 24 is revised, so that output adaptation degree $g_{min}$ of MIN value register 24 represent a minimum value of adaptation degree in each rule. As described above, the output adaptation degree $g_{min}$ is received by truncation unit 31 in response to the control signal of C2=1 in the last subrule (consequent rule) of each rule.

Figure 8:
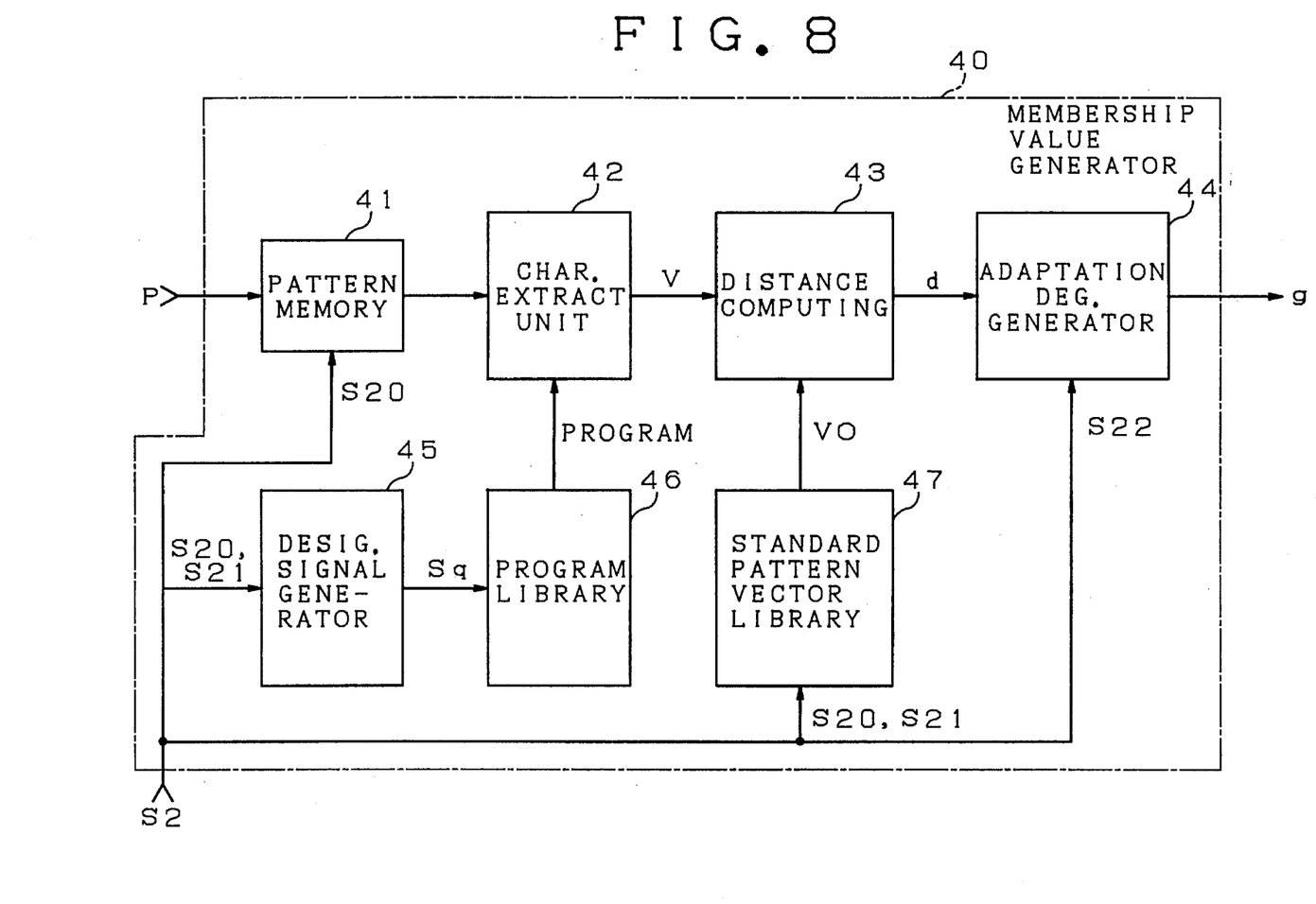
FIG. 8 is a schematic block diagram of a membership value generator.

Referring to FIG. 8, construction and operation of membership value generator 40 generating adaptation degree "g" subject to rule about pattern data will be described hereinafter.

When S20 is "1", input pattern data represented by selected input signal P is stored into pattern memory 41 to become an object to be processed in character or feature extract unit 42. When pattern data is picture data, pattern memory 41 is a picture memory storing picture data for each picture element. When its pattern is time series signal pattern, pattern memory 41 is a time series signal memory storing an amplitude value at a corresponding time corresponding at an area of address corresponding to a time.

In a feature extract program library 46 there are previously stored one or a plurality of feature extracting programs for each category name of pattern.

Figure 9:
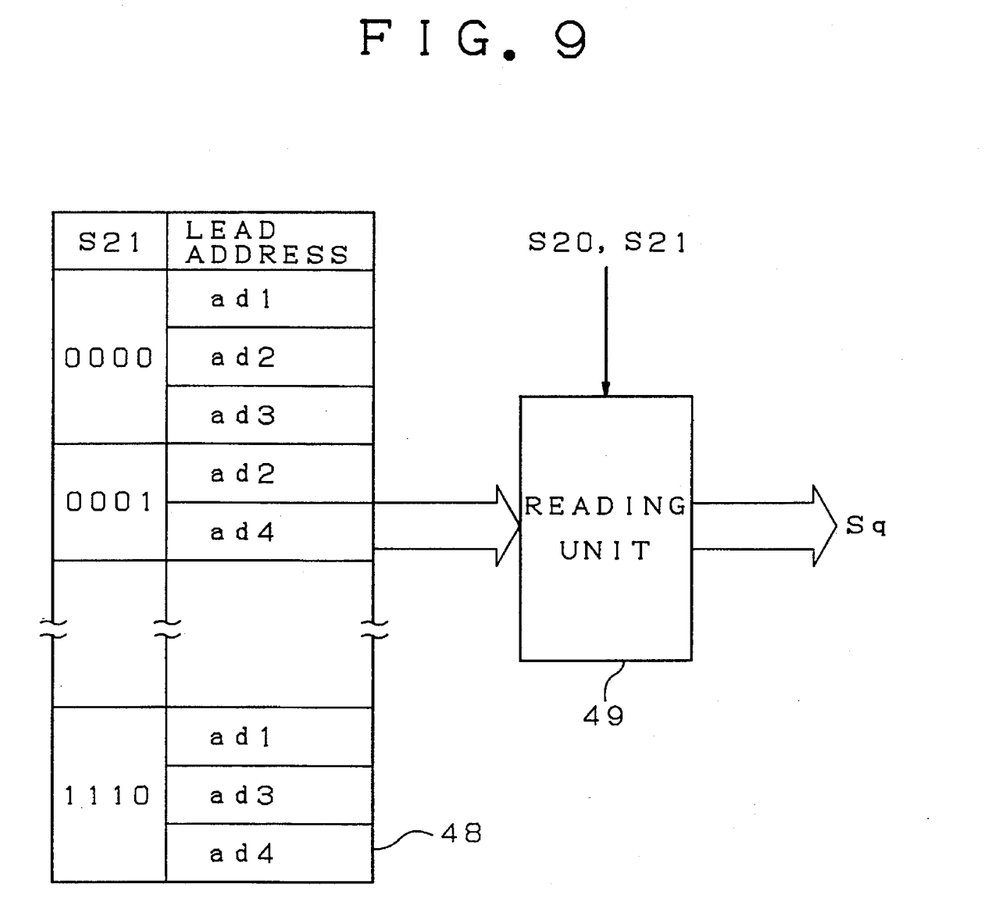
FIG. 9 is a schematic block diagram of a feature extracting program designation signal generator.

As shown in FIG. 9, a feature extracting program library 46 includes an address memory 48 storing lead addresses at an area of the program library 46 storing feature extracting program relating to category name, corresponding to code S21 representing category name of pattern. When there are a plurality of feature extracting programs corresponding to one category name, lead address of each program is stored corresponding to code of the category name.

As a subrule of antecedent about pattern data is read out and its codes S20 and S21 are applied to a designation signal generator 45, the generator 45 is activated in response to code signal S20 and all lead addresses (for example, lead address ad1, ad2, and ad3 in S21=000) of a feature extracting program are read out through a reading unit 49. A signal of the read lead address is applied to feature extracting program library 46 as a signal $S_q$ of set of lead address of program.

If the signal $S_q$ is applied, a feature extract program is read out from address designated by signal $S_q$ from program library 46. One or a plurality of feature extracting programs are applied to feature exact unit 42.

A feature quantity of pattern data P within pattern memory 41 is read out from feature extract unit 42 in accordance with feature extracting program set therein. Though it is possible that a plurality of kinds of feature quantity is extracted by one feature extracting program, it is assumed here that one kind of feature quantity is extracted by one feature extracting program for a simplified explanation. Thus extracted plurality of kinds of feature quantity are set to v1, v2, ..., vm. V=(v1, v2, ..., vm) can be called as a feature vector of pattern P. The feature vector V is applied to detection computing unit 43.

In library 47 of standard pattern vector there is previously stored a standard vector V0=(v01, v02, ..., v0m) which consists of a concurrence of feature quantity v01, v02, ..., v0m extracted by feature extracting program from standard pattern of category for each category name. Codes S20 and S21 are assigned to the library 47, whereby standard vector V0 of category name designated by code S21 is read out from library 47 for application to a distance computing section 43.

The distance computing section 43 computes a distance "d" between feature vector V and standard vector V0 in a feature space. For instance, distance "d" is expressed by the following equation.

$$d=|v1-v01|+|v2-v02|+ \ldots +|vm-v0m| \qquad \text{Equation 1}$$

It is possible that distance is computed after normalizing each element of feature vector and standard vector. In other words, for each parameter the parameter is subtracted by its average value, and the subtraction result is divided by a standard deviation of the parameter, to normalize parameters. The distance also may be computed by a pattern matching method. A pattern library is made, and standard pattern of each category is previously stored in the library for category name. Pattern matching unit is disposed and input pattern P stored in pattern memory 41 is compared with standard pattern of category name designated by code S21 stored in the pattern library to compute number of inconsistent pattern elements. The number of inconsistent is generated from distance computing section 43 as a distance between input pattern and standard pattern.

Adaptation degree generator 44 converts a distance "d" produced from distance computing section 43 into an adaptation degree "g" about category name regulated by rule of input pattern P. This conversion is executed by using such a simple function that g=1 when d=0 and g=0 when d=∞

For example, this conversion can be expressed by using a function shown by the following equation:

$$g=1/(1+d)^n \qquad \text{Equation 2}$$

"n" is a value designated by code S22 as described above, and expresses strictness of application of input in membership function computing.

It should be understood that the above description is merely illustrative of this invention and that many further changes and modifications may be made by those skilled in the art without departing from the scope of the appended claims.

What is claimed is:

1. A fuzzy inference system, comprising:
   a rule memory having a fuzzy rule stored therein, the fuzzy rule including an input variable and a distinction code identifying whether the input variable is a scalar quantity or image pattern data;
   first adaptation degree operation means for generating a first adaptation degree representing a membership function value corresponding to the input variable when the input variable is a scalar quantity;
   second adaptation degree operation means for generating a second adaptation degree representing a pattern category value corresponding to the input variable when the input variable is image pattern data;
   first selector means for selecting one of said first and second adaptation degrees in accordance with said distinction code included in the fuzzy rule; and
   inference operation means for applying a predetermined operation to the one of the first and second adaptation degrees selected by said first selector means to generate a fuzzy inference output.

2. A fuzzy inference system according to claim 1, further comprising second selector means for selecting an input signal designated by the input variable included in the fuzzy rule, the second selector means selecting the input signal from among a plurality of input signals provided by a plurality of sensors.

3. A fuzzy inference system according to claim 1, wherein said input variable is image pattern data from an imaging device.

4. An antecedent processing device for processing an input variable to generate an antecedent adaptation degree in accordance with a previously set fuzzy rule comprising a distinction code identifying whether the input variable is a scalar quantity or image pattern data, wherein the input variable is expressed using a membership function when the input variable is a scalar quantity and is expressed using a pattern category when the input variable is image pattern data, the device comprising:
   first adaptation degree operation means for generating a first adaptation degree representing a membership function value corresponding to the input variable to express a scalar quantity about a membership function designated by the fuzzy rule when the input variable is a scalar quantity;
   second adaptation degree operation means for generating a second adaptation degree representing a pattern category value corresponding to the input variable to express pattern data about a category designated by the fuzzy rule when the input variable is image pattern data;

first selector means for selecting one of said first and second adaptation degrees in accordance with said distinction code included in the fuzzy rule; and operation means for applying a predetermined operation to the one of the first and second adaptation degrees selected by said first selector means to generate an adaptation degree of antecedent for the fuzzy rule.

5. An antecedent processing device according to claim 4, wherein said input variable is image pattern data from an imaging device.

6. An adaptation degree generating device for developing an adaptation degree in accordance with a fuzzy rule expressed using a category of pattern about an input variable of image pattern data, comprising:

a standard pattern memory for previously storing standard image pattern data for each of a plurality of categories;

distance computing means for computing a distance between input image pattern data and standard pattern data of a category designated by a fuzzy rule of said memory; and adaptation degree generating means for converting the distance generated from said distance computing circuit means to an adaptation degree, said adaptation degree is a value "1" when the distance is zero and decreases as the distance increases.

7. An adaptation degree generating device according to claim 6, wherein said input variable of image pattern data is input from an imaging device.

8. A pattern input type of membership value generating device, comprising:

pattern data input means for inputting image pattern data;

standard pattern data generating means for converting a category related to image pattern data entered by said pattern data input means into standard pattern data about said category;

distance computing means for computing a distance between input image pattern data entered through said pattern data input means and standard pattern data generated by said standard pattern data generating means; and adaptation degree generating means for converting the distance generated from said distance computing means to an adaptation degree, said adaptation degree is a value "1" when the distance is zero and decreases as the distance increases.

9. A membership value generating device according to claim 8, wherein said standard pattern data generating means generates a feature vector of standard pattern data, and said distance computing circuit means extracts a feature quantity of the input image pattern data, generates a feature vector based on the extracted feature quantity, and computes a distance between the feature vector of the standard pattern data and the feature vector of the input image pattern data.

10. A membership value generating device according to claim 8, wherein said distance computing means executes a pattern matching of said standard pattern data with said input image pattern data to compute said distance in accordance with a degree of inconsistency between said standard pattern data and said input image pattern data.

11. A pattern input type of membership value generating device according to claim 8, wherein said pattern data input means further comprises an imaging device.

12. A fuzzy inference method, comprising the steps of:

expressing an input variable of scalar quantity using a membership function and an input variable of image pattern data using a pattern category;

previously storing into a rule memory a fuzzy rule comprising a distinction code identifying whether the input variable is a scalar quantity or image pattern data;

reading the fuzzy rule from said rule memory; generating a first adaptation degree of the input variable to express scalar quantity about a membership function designated by said read fuzzy rule when the input variable of the rule is a scalar quantity;

generating a second adaptation degree of the input variable to express pattern data about a pattern category designated by said read fuzzy rule when the input variable is image pattern data; and applying a predetermined operation to one of said first and second adaptation degrees to generate a fuzzy inference output.

13. A fuzzy inference method according to claim 12, wherein said expressing step includes the further substep of inputting said image pattern data from an imaging device.

14. A method for generating an adaptation degree in accordance with a fuzzy rule expressed using a category of pattern about an input variable of image pattern data, comprising the steps of:

previously storing standard image pattern data into a standard pattern memory for each of a plurality of categories;

computing a distance between an input image pattern data and standard pattern data of a category designated by a fuzzy rule of said memory; and converting said computed distance to an adaptation degree, said adaptation degree is a value "1" when the distance is zero and decreases as the distance increases.

15. A method for generating an adaptation degree according to claim 14, wherein said previously storing step includes the further substep of inputting said image pattern data from an imaging device.

16. A pattern input type membership value generating method, comprising the steps of:

inputting image pattern data;

converting a category related to said image pattern data into standard pattern data about said category;

computing a distance between said image pattern data and said standard pattern data; and converting said computed distance to an adaptation degree, said adaptation degree is a value "1" when the distance is zero and decreases as the distance increases.

17. A membership value generating method according to claim 16, further comprising the steps of:

generating a feature vector of standard pattern data;

extracting a feature quantity of input image pattern data;

generating a feature vector based on the extracted feature quantity; and computing a distance between the feature vector of the standard pattern data and the feature vector of input image pattern data.

18. A membership value generating method according to claim 16, further comprising the step of executing a pattern matching of said standard pattern data with said input image pattern data to compute said distance in accordance with a degree of inconsistency between said standard pattern data and said input image pattern data.

19. A pattern input type membership value generating method according to claim 16, wherein said image pattern data is input from an imaging device.

* * * * *